United States Patent

[11] 3,597,001

| [72] | Inventors | Raymond S. Morford;<br>Byrl A. Jedlicka, both of Decatur, Ill. |
|---|---|---|
| [21] | Appl. No. | 839,845 |
| [22] | Filed | July 8, 1969 |
| [45] | Patented | Aug. 3, 1971 |
| [73] | Assignee | Caterpillar Tractor Co.<br>Peoria, Ill. |

[54] TIRE RIM ADAPTER
8 Claims, 3 Drawing Figs.

[52] U.S. Cl. ..................................... 301/11,
152/66
[51] Int. Cl. ............................................. B60b 23/00
[50] Field of Search ............................................ 301/11, 23;
152/66, 339, 340, 384

[56] References Cited
UNITED STATES PATENTS

| 2,630,198 | 3/1953 | Kraft | 152/384 (X) |
| 3,294,142 | 12/1966 | Robertson | 152/339 |
| 3,382,007 | 5/1968 | Regnaucourt et al. | 301/11 (X) |

*Primary Examiner*—Milton Buchler
*Assistant Examiner*—Carl A. Rutledge
*Attorney*—Fryer, Tjensvold, Feix, Phillips and Lempio ABSTRACT: An adapter device to connect a tire rim to a tire rim of smaller diameter so that the first tire rim and an inflated tire thereon may be used for test driving a piece of heavy equipment before it is sold. The purpose is to enable a set of test tires to be used repeatedly so that the machine can be sold with new tires which have not been marred during testing. The adapter includes an inflatable tube and drive lugs disposed between the tire rim on the machine and the rim of the test tire.

Manufacturers of large earthmoving machinery generally operate machines on a test track prior to delivery to a dealer. If during this final check, the tires are marred or even badly soiled, the dealer or eventual customer may demand a discount. Since large tires often cost thousands of dollars each, this becomes very costly to the manufacturer. Using the same tire repeatedly for test purposes and changing to new tires when the machine is delivered is one solution, but this too creates expense in the form of labor involved in mounting two sets of tires rather than one.

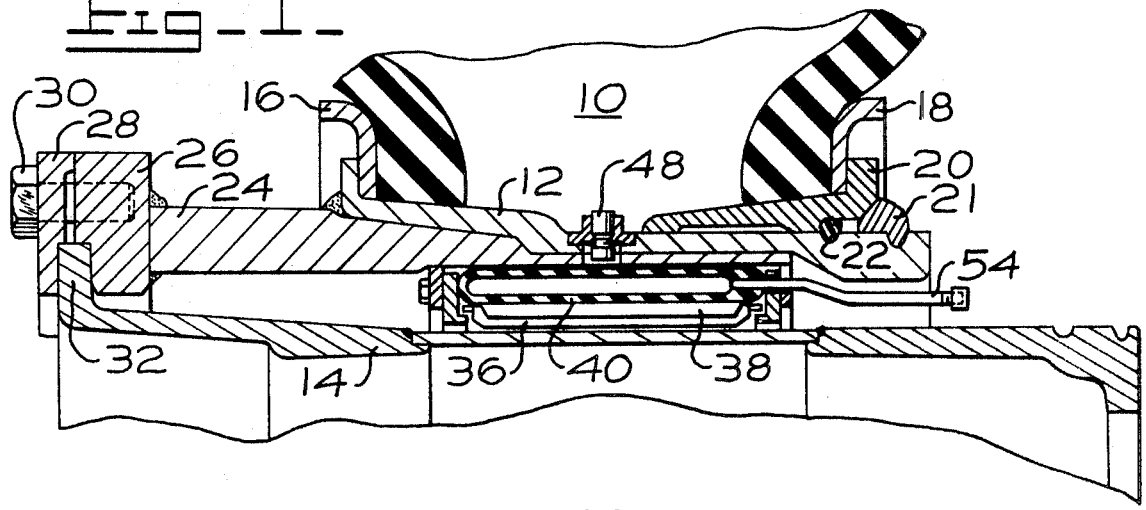
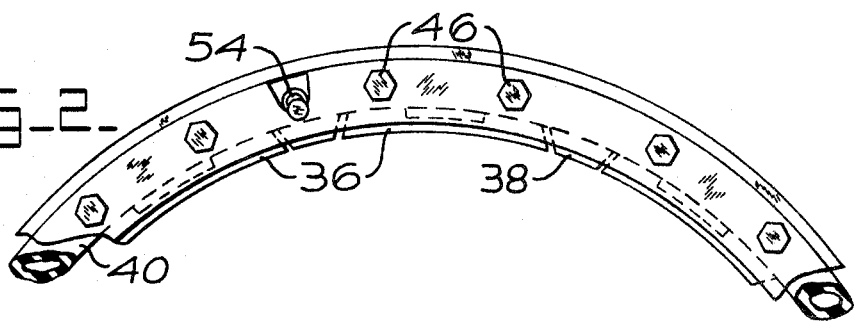
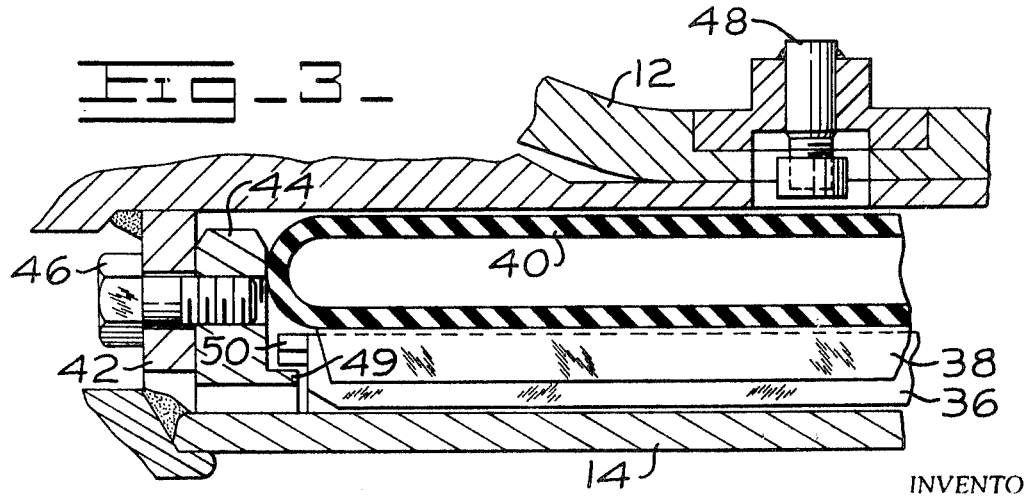
INVENTORS
RAYMOND S. MORFORD
BYRL A. JEDLICKA
BY
ATTORNEYS

TIRE RIM ADAPTER

The present invention provides a set of test tires that are mounted and inflated on rims and provided with adapters to enable them to be quickly mounted upon the rims of the machine for test purposes to be readily dismounted at the completion of the test so that new tires in perfect condition can be placed upon the machine just before it is delivered.

The manner in which the invention is carried into practice is described in detail in the following specification wherein reference is made to the accompanying drawing.

In the drawings

FIG. 1 is a fragmentary sectional view through a tire rim and adapter embodying the present invention showing it in place upon a larger rim which is a part of a machine to be tested.

FIG. 2 is a fragmentary view in elevation of part of the adapter which is illustrated in FIG. 1; and FIG. 3 is an enlarged fragmentary sectional view of a part of the adapter that is shown in FIG. 1.

In FIG. 1 of the drawing, a test tire represented at 10 is shown as mounted on a rim base 12 and as secured by quick detachable means, presently to be explained, to a rim base 14 of the vehicle to be tested. While the rim base 12 is narrower than the base 14, it is of greater diameter and will have a tire which, though smaller in cross section than the tire to be placed upon the machine, is adequate for testing purposes. A tire is held on the rim base 12 between an inner flange 16 and an outer flange 18, the latter being carried by a removable bead seat band 20 which is held in place by a split lock ring 21 in a conventional and well-known manner. A rubber O-ring 22 seals against escape of air from the tire beneath the bead seat band.

In accordance with the present invention, the rim base of the test tire is secured as by welding to an adapter ring 24 which surrounds the rim base 14 on the machine to be tested. The adapter ring 24 is secured to the rim base by a series of two lugs, one part of such a lug being shown at 26 as welded to the ring 24, and the other part, shown at 28, is secured by a cap screw 30 which clamps an inner flange 32 on the rim base 40 between the parts holding the ring and the test tire assembly against axial displacement.

To hold the ring against radial displacement and to provide a driving connection between the test tire and the vehicle rim base, a plurality of friction shoes 36 (See also FIG. 2 and 3.) are disposed above the ring base between spaced driving lugs 38 which are secured as by bonding to an inflatable tube 40, the tube and the lugs 36 are confined between sidewalls which are annular in configuration and welded to the adapter ring 24, one such sidewall being best shown in FIG. 3 at 42. Annular keeper rings, such as shown at 44 in FIG. 3, are secured to the sidewalls as by cap screws 46 and have flanges 49 underlying projections 50 which extend outwardly from the ends of the shoes 36, thus, the shoes are free to float between the driving lugs 38, but upon inflation of the tube 40 will be forced into friction driving contact with the large rim base 14.

The test tire 10 is inflated through a suitable fitting 48 before it is mounted on the machine and remains inflated through successive test operations since there is no necessity for removing it from its rim between tests. A fitting for inflating the tube 40 to provide the friction driving is illustrated 54 in FIGS. 1 and 2 as being of elongated configuration so that it extends to a convenient position for inflation and deflation. Since the only contact between the test tire and its adapter mechanism is effectively concealed when the new tires are placed on the machine, no noticeable marring or destruction of finish has been caused and the tires eventually to be used on the machine are fitted and inflated only once and will be in perfect condition when the machine is delivered.

What we claim is:

1. An adapter to connect a first tire rim for rotation with a second rim of smaller diameter comprising a cantilevered support means associated with said first rim positioning said first rim in spaced concentric relationship on said second rim, at least one inflatable tube disposed between said rims, a plurality of friction members disposed between said rims, a plurality of friction members disposed between said tube and one of the rims, and means to enable inflation of the tube to force the friction members into engagement with said one rim providing stabilization and drive between said rim so the vehicle can be supported by a test tire mounted on said first rim.

2. The adapter of claim 1 in which the tube is attached on the first tire rim and the friction members engage the outer periphery of the second tire rim.

3. The adapter of claim 2 with spacer members between the friction members and fixed to the tube.

4. The adapter of claim 3 in which the friction members are free floating but retained between the spacers and in proximity to the tube by retaining members on opposite sides of the tube.

5. The adapter of claim 1 in which the cantilevered support means includes means to secure the first and second rims against relative axial displacement.

6. The adapter of claim 5 in which said means comprises an annular adapter ring welded to the first rim and detachably secured to the second rim in spaced relation thereto.

7. The adapter of claim 6 in with friction means disposed in the space between the adapter ring and the second ring to provide a driving connection between the rims.

8. The adapter of claim 6 in which the second rim has a flange at its inner edge and the detachable securing means comprises lug means on the adapter ring embracing said flange.